(12) United States Patent
Laycock et al.

(10) Patent No.: US 9,454,005 B2
(45) Date of Patent: Sep. 27, 2016

(54) LENS DEPLOYMENT APPARATUS

(71) Applicant: BAE SYSTEMS plc, London (GB)

(72) Inventors: Leslie Charles Laycock, Chelmsford (GB); David Andrew Cocksedge, Chelmsford (GB)

(73) Assignee: BAE SYSTEMS plc, London (GB)

( * ) Notice: Subject to any disclaimer, the term of this patent is extended or adjusted under 35 U.S.C. 154(b) by 24 days.

(21) Appl. No.: 14/381,466

(22) PCT Filed: Jan. 30, 2013

(86) PCT No.: PCT/GB2013/050201
§ 371 (c)(1),
(2) Date: Aug. 27, 2014

(87) PCT Pub. No.: WO2013/128159
PCT Pub. Date: Sep. 6, 2013

(65) Prior Publication Data
US 2015/0098133 A1    Apr. 9, 2015

(30) Foreign Application Priority Data
Feb. 28, 2012  (GB) .................................. 1203411.2

(51) Int. Cl.
G02B 27/14   (2006.01)
G02B 27/01   (2006.01)
G02B 7/182   (2006.01)
G02B 7/02    (2006.01)

(52) U.S. Cl.
CPC ........... *G02B 27/0149* (2013.01); *G02B 7/023* (2013.01); *G02B 7/1827* (2013.01); *G02B 27/0101* (2013.01); *G02B 2027/0141* (2013.01); *G02B 2027/0154* (2013.01)

(58) Field of Classification Search
CPC ............ G02B 7/1827; G02B 27/0149; G02B 2027/0154
USPC ....................... 359/630–632, 12–15; 345/7–8
See application file for complete search history.

(56) References Cited

U.S. PATENT DOCUMENTS

| | | | |
|---|---|---|---|
| 5,204,666 A | 4/1993 | Aoki et al. | |
| 7,869,129 B2 | 1/2011 | Lebreton | |
| 8,077,396 B2 * | 12/2011 | Croy ...................... | B60K 35/00 359/632 |
| 9,063,327 B2 | 6/2015 | Moussa et al. | |

(Continued)

FOREIGN PATENT DOCUMENTS

| | | |
|---|---|---|
| JP | S63122829 A | 5/1988 |
| JP | 10268227 A | 10/1998 |

(Continued)

OTHER PUBLICATIONS

International Search Report received for Patent Application No. PCT/GB2013/050201, mailed on Apr. 25, 2013, 4 pages.

(Continued)

*Primary Examiner* — Tuyen Tra
(74) *Attorney, Agent, or Firm* — Finch & Maloney PLLC

(57) ABSTRACT

The following invention relates to an improved lens apparatus for use in a head up display (HUD), particularly for providing a deployment means for a HUD.
The deployment device comprises a servomotor and cord assembly to move the carrier, wherein the carrier is biased, such that the first action is to deploy the lens, and then cause subsequent movement of the lens through an arc.

19 Claims, 4 Drawing Sheets

(56) References Cited

U.S. PATENT DOCUMENTS

| | | |
|---|---|---|
| 2008/0285138 A1 | 11/2008 | Lebreton |
| 2009/0086329 A1 | 4/2009 | Potakowskyj et al. |
| 2011/0242668 A1 | 10/2011 | Potakowskyj et al. |
| 2013/0194518 A1 | 8/2013 | Moussa et al. |

FOREIGN PATENT DOCUMENTS

| | | |
|---|---|---|
| JP | 2006143125 A | 6/2006 |
| JP | 2007086226 A | 4/2007 |
| JP | 2007182132 A | 7/2007 |
| JP | 2009515768 A | 4/2009 |
| WO | 2008063632 A2 | 5/2008 |
| WO | 2012007305 A1 | 1/2012 |
| WO | 2013128159 A1 | 9/2013 |

OTHER PUBLICATIONS

GB Intellectual Property Office Search Report under Section 17(5) received for GB Patent Application No. 1203411.2 mailed Jun. 21, 2012, 3 pages.

International Preliminary Report on Patentability and Written Opinion of The International Searching Authority received for Patent Application No. PCT/GB2013/050201, mailed on Sep. 12, 2014. 9 pages.

* cited by examiner

LENS DEPLOYMENT APPARATUS

The following invention relates to a lens deployment apparatus, for providing deployment and adjustment of a lens, particularly a partially reflective combiner for use in vehicle head up display apparatus.

The following invention relates to an improved lens apparatus for use in a head up display particularly for providing HUD with a depth of field and more particularly with providing a secondary virtual image in a contrasting or different colour so as to provide a warning message.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

According to a first aspect of the invention there is provided a lens deployment device, comprising a housing, at least one lens located in a mount, said lens capable of adopting a first stowed configuration substantially within said housing and a second active configuration, said mount comprising pivotal fixing points, said pivotal fixing points pivotally attached to a carrier, wherein said carrier is located within at least one running groove in said housing, such that in use said lens is pivotable about its centre line.

In a highly preferred arrangement the mount and pivotal fixing point is located at the base of the lens, such the sides of the lens are substantially free of fixings.

The lens and associated mount, are moved and pivoted at the base of the lens, this allows the lens once in its second active configuration, to have the centre of the lens a substantially fixed distance from a user and or the display.

The display is the visual output means that provides system information that is to be displayed to a user, the user is a person or more specifically the eye-line or line of sight of the person.

Preferably the running groove is arcuate, such that the carrier describes an arc, which allows the centre of the lens to remain at a fixed point from the user, without having to pivotally mount the lens at its centre line. The running groove may have a minima, preferably the minim is at substantially the midpoint of the arc, such that during use, in the active configuration, the carrier is at rest in the minima.

The carrier and running groove may have complimentary low friction running gear to provide ready movable engagement of the carrier within the running groove, such as sliders, wheels, or even a rack and pinion arrangement, so as to avoid the carrier moving out of contact with housing's running groove. Preferably said running gear on the carrier runs within an internal running groove. The running groove may be a cut out or etched portion of the housing and the running gear on the carrier runs within the cut out or etched portion.

The carrier is operably linked to an electric motor, the link may be a rigid, elastic or a flexible linkage, and may take the form of a cord or belt.

The carrier may comprise at least one end stop to allow substantially vertical erection of said lens. The mount comprises at least one pulley which is fixed, such that in use, action of the electric motor via the operable link on the pulley causes, the lens to be moved from said first stowed configuration substantially within said housing to said second active configuration.

The action of the motor on the pulley, allows the deployment of the lens, the end stop ensures that the lens reaches a reproducible active position, further action on the pulley then moves the carrier within the groove. In order to provide this sequence of events, the pulley comprises a first bias means, to retard the rotation of the pulley and hence mount. The carrier comprises a second bias means, which second bias means is attached between the carrier and housing or mount, wherein the stiffness of the second bias means is greater than the first bias means, such that in use, a force applied to the pulley causes said lens to be moved from said first stowed configuration substantially within said housing to said second active configuration. The bias means may be selected from any resilient means, such as a spring, elastic or rubber cords, in a preferred arrangement the first bias means is a torsion spring and the second bias means is a tension spring.

A display device for vehicles comprising,
a display which provides system information that is to be displayed to a user,
a lens deployment device according to the invention, wherein the lens is a partially reflecting combiner, which magnifies the system information from the display, and provides a virtual image of said display, outside of said vehicle.

The use of a partially reflective combiner removes the requirement of projecting the image directly onto a windscreen, which latter method typically requires specific alignment of the display to ensure that the virtual images appear in the eye line of the user.

In a highly preferred arrangement the partially reflecting combiner has a first curved surface $S_1$ located closest to the display, and a second curved surface $S_2$, located furthest from the display, wherein the radii of curvature of surface $S_2 > S_1$, so as to provide two non-coincident virtual images; yet more preferably wherein the radius of curvature, $R_2$, of surface $S_2$ is adjusted to generate a secondary virtual image that appears in front of the primary virtual image generated by surface $S_1$.

The display may provide an output from at least one system information, such as for example the vehicles original on board display panel (i.e. dashboard), an OEM or add-on entertainment system, navigation system or communication system. It may be desirable as a retro fit option, to provide a virtual image of the existing vehicle dashboard by using a video camera to capture real time output from the vehicle dashboard and so provide an image on the display panel, and hence to provide a virtual image via the partially reflective combiner. It may be desirable to provide further information from an external source i.e. traffic information or system information from at least two system information sources, the system information may then be overlaid or provided as two discrete messages, typically a warning secondary virtual image.

The lens surface $S_1$ and $S_2$ preferably have a curvature that is a smooth arcuate curve, such as a part of a circle or an ellipse. The radii $R_1$ and $R_2$ and hence of curvature of surface $S_2 > S_1$, so as to provide two non-coincident virtual images. Preferably the partially reflecting combiner is a negative meniscus lens.

The user is a person or more specifically the eye-line or line of sight of the person.

The combiner may have a thickness ($\Delta U$) in the range of from 2 mm to 6 mm, preferably in the range of from 3 mm to 5 mm. The combiner may be selected from any material which has a high optical transmission in the visible region, typically 400-800 nm, such as, for example glass, polycarbonate or PMMA (polymethyl methacrylate), preferably the refractive index (n) is in the range of from 1.30 to 1.80, more preferably 1.45 to 1.65.

The surfaces may include one or more of a texture, coating, dye, light emitting layer, matte finish, diffuse finish, specular finish, and optically smooth finish.

The surface $S_1$ of the combiner provides the first primary virtual image, and surface $S_2$, provides the secondary virtual image. The manipulation of the radii of curvature may be used to enhance the secondary virtual image. If the secondary virtual image generated by the secondary reflection is such that it appears in close proximity to the primary virtual image generated by the first surface $S_1$, then the virtual image will appear to have a 3-D effect. For example, if the speed of the vehicle is being displayed, the numerals will appear to have depth, resulting in a more substantial appearance.

In one arrangement the separation between the two virtual images $\Delta V$, may have a separation which provides a 3D perspective, such that the $\Delta V$ may be selected in the region of 1 mm to 20 mm, more preferably 3 mm to 10 mm. Where $\Delta V$ is small, then the difference of the radii $R_2$ and $R_1$, of lens surfaces $S_2$ and $S_1$ will be small, such as, for example 410 mm and 400 mm respectively.

When the separation between the two virtual images $\Delta V$ is selected such that it provides a warning secondary virtual image, it may be difficult to visually distinguish from the primary virtual image. It may be desirable to provide the warning secondary virtual image in a colour which visually contrasts with the primary virtual image.

In a highly preferred arrangement there may be at least one anti reflection coating on surface $S_1$ and at least one anti reflection coating on surface $S_2$. In a highly preferred arrangement, the anti-reflection coating on $S_1$ and $S_2$ are selected, such that $S_1$ is spectrally matched to the display's spectral output, to provide high reflectivity at specific wavelengths and also possesses a reflectance minima in a first narrow wave band. The antireflective coating on surface $S_2$ is selected to have a reflectance maxima in substantially the same first narrow wave band, and a reflectance minima across the remainder of the visible wavebands, such that said secondary virtual image projected from surface $S_2$ is presented in the colour as defined by the first narrow waveband, and is additionally presented in front of the primary virtual image from the surface $S_1$.

By way of an example only, the coatings on $S_1$ and $S_2$ may be selected such that the first narrow wave band is selected such that the second surface only permits a red colour to be displayed as a coloured warning secondary virtual image, thus providing a warning or danger information in front of the primary virtual image from surface $S_1$.

The anti reflective coating may be selected from any spectrally active coating or multiple thin films and may comprise, such as, for example broad or narrow band filters, comprising dyes, reflective notch films, such as, for example rugate thin films, diffraction gratings, as known in the art. Typical antireflective coatings may consist of alternating high (2.0-2.5) and low (1.38-1.46) refractive index layers of dielectric materials. Typical high index materials include $Ta_2O_5$, $TiO_2$, $Nb_2O_5$, $ZrO_2$ and SiN, and low index materials mainly $SiO_2$ and $MgF_2$. The coatings may be deposited to provide layers of quarter-wave (QW) thickness. The broader the band covered, generally the more layers are required in the coating applied to the surface.

The display may be selected from any output means such as, for example CRT, LCD, LED, OLED, projection, laser, liquid crystal on silicon (LCOS) device, such LCOS devices being illuminated by narrowband red, green and blue LED sources.

In a preferred arrangement the anti reflective coating on $S_1$ and $S_2$ may be selected such that only a narrow bandwidth of the red light, such as, for example, the red LED from a LCOS device may be partially reflected by the surface coating on $S_2$, so as to provide red warning or danger system information, to the user, as the secondary virtual image which appears in the foreground of the primary virtual image. Preferably the antireflective coating on surface $S_1$ can selectively not permit reflectance of only said narrow bandwidth, and so may allow other wavelengths of red light to be partially reflected, so as to permit a primary virtual image with a visually acceptable RGB colour output to the user, rather than the prior art typical monochrome colour output.

An embodiment of the invention will now be described by way of example only and with reference to the accompanying drawings of which:—

Figure 1:
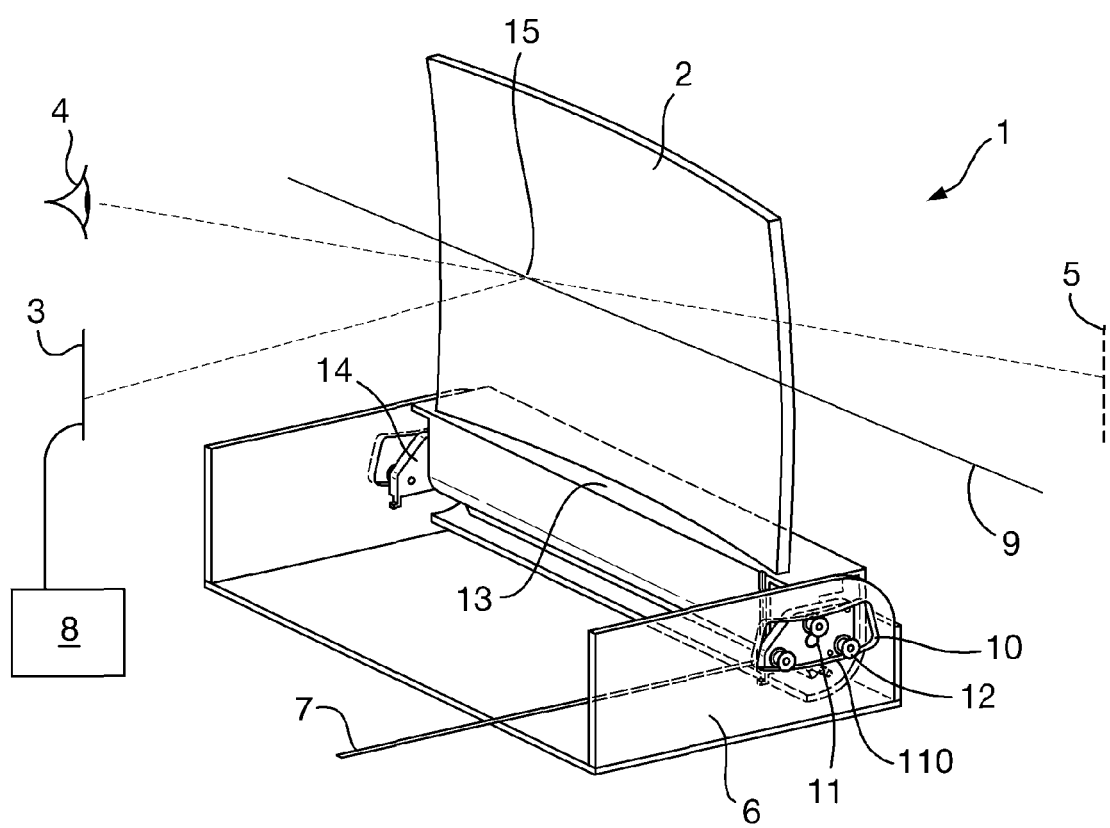
FIG. 1 shows a lens deployment apparatus for a vehicle

Turning to FIG. 1, there is provided a HUD system 1 comprising a lens, particularly a partially reflective combiner 2. The combiner lens may be deployed to the active position as shown when in use, such that the user 4, is able to view a virtual image 5, which is caused by the display 3, projecting a virtual image of the data from the vehicle information system 8.

The lens 2 is located in a mount 13, which mount is pivotally attached to the carrier 14, via pivotal fixing point 11. The lens when in the first inactive stowed state lies within housing 6. The carrier 14 has a plurality of rollers 12, which allows free movement in the running groove 10, which is arcuate in shape. The running groove 10 has a minima 110, located at substantially a midpoint within the groove 10, such that during the deployed configuration the carrier locates at a minimum point. As the carrier moves through the arc the centre line 9 of the lens 2 remains at a fixed distance from the user 4 (and display 3). The movement of the carrier within the arc is able to reduce the effect of any movements of the vehicle, such that the virtual image 5 remains in view, as the line of sight 15 passes substantially through the centre of the lens 9.

A draw cord 7 may be activated by a servomotor (not shown), to rotate and traverse the carrier 14, and hence erect and pivot the combiner 2. The draw cord is attached to a pulley which is located about the pivot fixing, (FIG. 4), such that the pulley moves the mount 13 from a horizontal position (stowed) to a substantially vertical position (active).

Figure 2A:
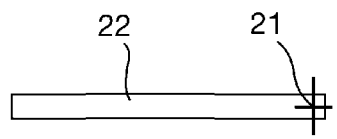
FIG. 2 shows a schematic of lens orientations
Figure 2B:
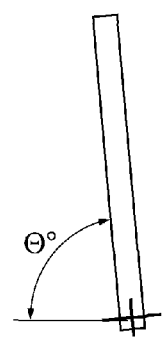
Figure 2C:
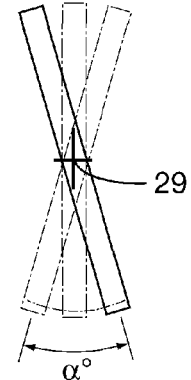

FIGS. 2a, b and c, show a simplified schematic of the lens 22, in a 2a) inactive, stowed state, wherein the pivotal fixing point 21 is located at the bottom of the lens 22. FIG. 2b, shows the lens reaches a near vertical angle $\Theta°$, typically in the range of 80 to 100°, typically 85°. FIG. 2c, clearly shows that by movement of the mount (not shown), through an arc, allows the centre point of the lens 29, to remain substantially fixed in space, and hence with respect to the user/display (not shown).

Figure 3:
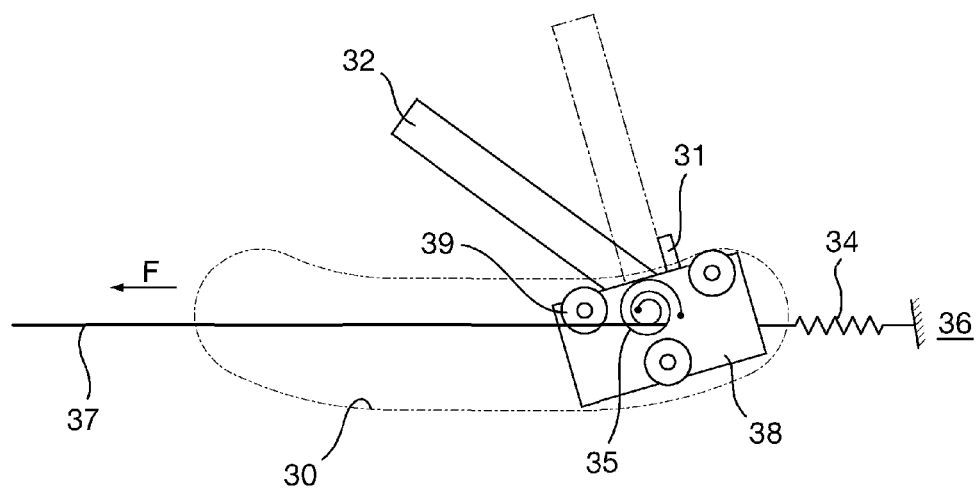
FIG. 3 shows a side view schematic of a lens carrier

FIG. 3 shows a side view of the carrier 38, which is slidable by action of the rollers 39 within the groove 30. A torsion spring 35 is attached to the pulley (not shown) to retain the lens in the horizontal position when there is no or insufficient force F applied to the pulley. The tension spring 34 retains the carrier 38 in a retained position (as shown), when there is no or insufficient force F applied. The application of a Force F on the cord 37, acts on carrier 38, via pulley (not shown). The stiffness of the torsion spring 35 is less than the stiffness of the tension spring 34 (attached to the carrier 36). Thus once the force is applied to the pulley the torsion spring is overcome first, resulting in the erection of the lens 32 to a substantially vertical active position, which active position is defined by the use of an end stop 31, to prevent further movement of the lens. As further force is applied to the cord 37 (and hence pulley), will then overcome the tension spring 34, and so the carrier will move in an arc fashion, moving within the running groove 30. The carrier is therefore moved by balancing the forces of the servomotor and tension spring 34.

Once the force is removed from the carrier, it will revert to its stowed configuration and the lens 32 will adopt a non-erect position.

Figure 4:
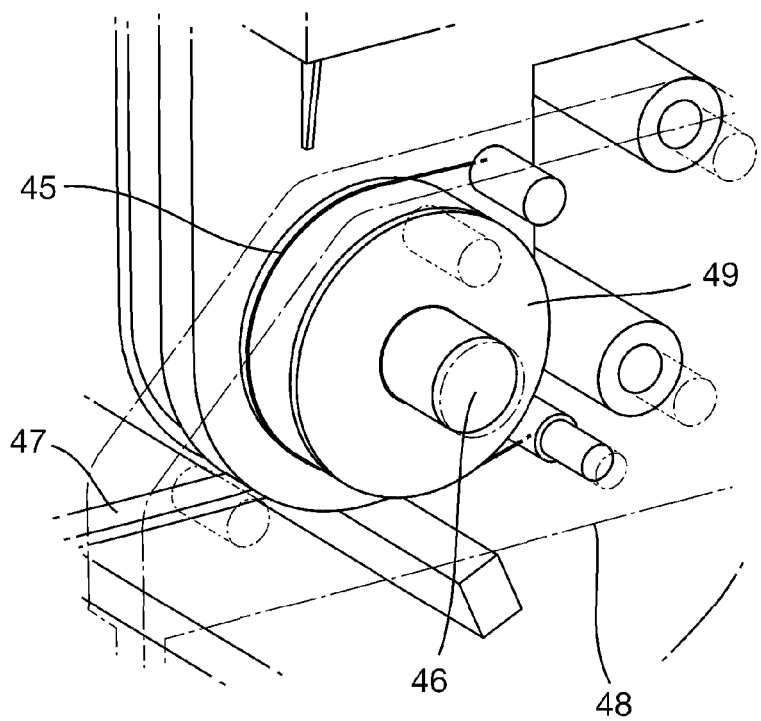
FIG. 4 shows a side view close up of the torsion resilient means

FIG. 4 shows a close up of the carrier 48, with the pulley 49 forming an integral part of the pivotal fixing 46. A resilient means 45, such as elastic, is in contact with the pulley, such that the pulley, in the absence of force from link cord 47, remains in a bias stated to keep the lens (not shown) in the inactive or stowed state. Sufficient force on cord 47, causes the pulley 49 to rotate and overcome the elastic 45, and allows the pulley and hence mount to rotate to cause the lens to be moved into the active position.

Figure 5:
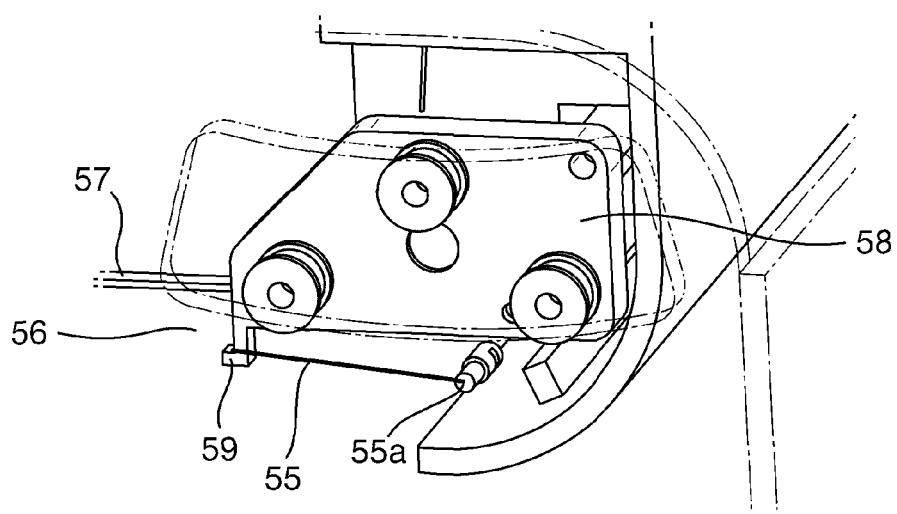
FIG. 5 shows a side view close up of the tension resilient means

FIG. 5 shows a close up schematic of the carrier 58 within a groove 57 of the housing 56. There is a resilient means 55 (elastic cord, rubber cord or spring), which is attached to the carrier 58, at an anchor point 59, and at the cords distal end is attached to the mount 55a (or indeed simply connected to the housing 56. The resilient means 55, ensures that the carrier returns to the stowed position when there is no force applied to the linkage cord 57. The use of resilient means, whether elastic, rubber, springs, etc, allows the use of one servomotor to control the deployment and movement of the carrier and hence lens.

Figure 6:
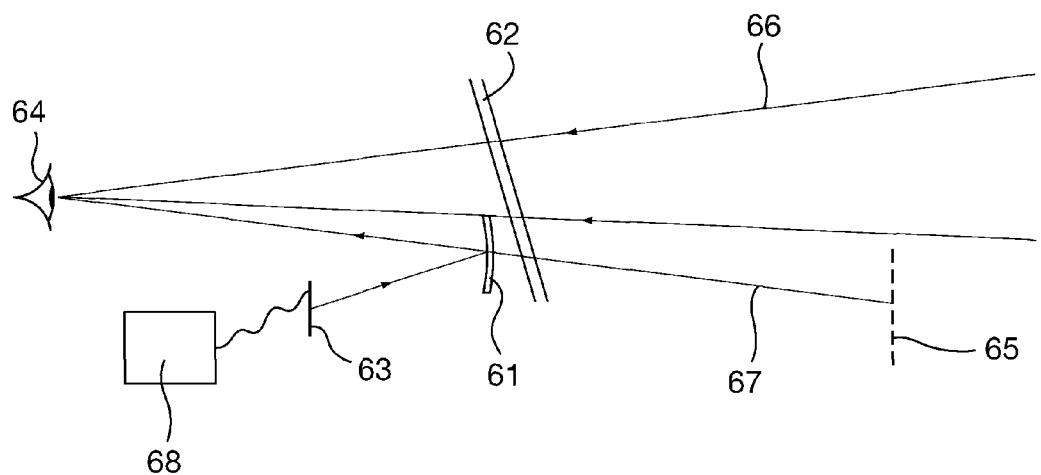
FIG. 6 shows a ray diagram for a partially reflective combiner

FIG. 6 there is provided a display device 69, comprising a display 63, which provides a virtual image to be displayed in the line of sight 67, of the user 64. The display 63 outputs visual data from the vehicle information system 68, such as, for example, a car dashboard, satellite navigation, or an entertainment system.

The display 63 projects the image to a partially reflective combiner 61, which provides a virtual image 65, remote from the user 64, outside of the vehicle windscreen 62. The use of a combiner 61, removes the requirement of using the vehicle windscreen 62 as the partially reflective surface, and thus allows the display device 69 to be readily retrofitted to any vehicle, without prior consideration of the optical properties of the vehicle windscreen.

The invention claimed is:

1. A partially reflective combiner deployment device, comprising a housing, at least one partially reflective combiner located on a lower edge of the housing, in a mount, said partially reflective combiner capable of adopting a first stowed configuration substantially within said housing and a second active configuration in which the partially reflective combiner is configured to project an image along a line of sight of a user, said mount comprising pivotal fixing points, said pivotal fixing points pivotally attached to a carrier, wherein said carrier is located within a running groove in said housing, wherein the running groove is an arc and has a minima at substantially a midpoint of the running groove, such that in use in said second active configuration, the carrier is located in said minima, such that said partially reflective combiner pivots about a centre line, wherein said centre line is an axis which intersects and is substantially orthogonal to a Principal axis of the partially reflective combiner.

2. A device according to claim 1, wherein the lens has a base, and the carrier, mount and the one or more pivotal fixing points are located at the base of the partially reflective combiner.

3. A device according to claim 1, wherein the carrier comprises low friction running gear to provide ready movable engagement with the running groove.

4. A device according to claim 3, wherein the running gear is selected from sliders, wheels, or a rack and pinion arrangement.

5. A device according to claim 3, wherein the running groove is an internal running groove, and said running gear runs within said internal running groove.

6. A device according to claim 3, wherein the running gear comprises a slider.

7. A device according to claim 3, wherein the running gear comprises a wheel.

8. A device according to claim 3, wherein the running gear comprises a rack and pinion arrangement.

9. A device according to claim 1, wherein the carrier is linked operably to an electric motor.

10. A device according to claim 9, wherein the mount comprises at least one pulley, such that in use, action of the electric motor via the operable link on said pulley causes:
   the partially reflective combiner to be moved from said first stowed configuration substantially within said housing to said second active configuration; and
   movement of the carrier within the running groove.

11. A device according to claim 10, wherein the pulley comprises a first bias to retard rotation of said mount, and the carrier comprises a second bias attached between the carrier and housing or mount, wherein the stiffness of the second bias is greater than the first bias.

12. A device according to claim 11, wherein the first bias provides torsion resilience and the second bias provides tension resilience.

13. A device according to claim 1, wherein carrier comprises at least one end stop to provide substantially vertical erection of said partially reflective combiner.

14. A display device for vehicles comprising:
   a display which provides system information that is to be displayed to the user; and
   a partially reflective combiner deployment device according to claim 1, wherein the partially reflecting combiner is configured to magnify the system information from the display, and provide a virtual image of said display, outside of said vehicle.

15. A device according to claim 1, wherein the running groove includes a plurality of running grooves.

16. A display device for vehicles comprising:
   a display which provides system information that is to be displayed to the user; and
   a partially reflective combiner deployment device according to claim 1, wherein the partially reflective combiner is configured to magnify the system information from the display and provide a virtual image of said display.

17. A lens deployment device, comprising a housing, at least one lens located in a mount, said lens capable of adopting a first stowed configuration substantially within said housing and a second active configuration, said mount comprising pivotal fixing points, said pivotal fixing points pivotally attached to a carrier, wherein said carrier is located within a running groove in said housing, such that in use said lens is pivotable about its centre line, wherein the carrier is linked operably to an electric motor, and wherein the mount comprises at least one pulley, such that in use, action of the electric motor via the operable link on said pulley causes:

the lens to be moved from said first stowed configuration substantially within said housing to said second active configuration; and movement of the carrier within the running groove.

18. A device according to claim 17, wherein the running groove is arcuate.

19. A device according to claim 17, wherein the running groove is arcuate and has a minima at substantially a midpoint of the running groove.

\* \* \* \* \*